(12) United States Patent  (10) Patent No.: US 8,736,646 B2
Wang Keng Meng et al.  (45) Date of Patent: May 27, 2014

(54) PRINTING UNIT FOR A WEIGHING DEVICE

(75) Inventors: Albert Wang Keng Meng, Singapore (SG); Harald Blocher, Schoemberg (DE)

(73) Assignee: Bizerba GmbH & Co. KG, Balingen (DE)

( * ) Notice: Subject to any disclaimer, the term of this patent is extended or adjusted under 35 U.S.C. 154(b) by 0 days.

(21) Appl. No.: 13/531,662

(22) Filed: Jun. 25, 2012

(65) Prior Publication Data

US 2013/0341103 A1  Dec. 26, 2013

(51) Int. Cl.
*B41J 2/32* (2006.01)
*B41F 19/00* (2006.01)
*G01G 23/42* (2006.01)

(52) U.S. Cl.
CPC .. *B41F 19/00* (2013.01); *B41J 2/32* (2013.01); *G01G 23/42* (2013.01)
USPC ........................................... 347/171; 347/222

(58) Field of Classification Search
CPC ................................ B41F 19/00; G01G 23/42
USPC .......................................... 347/1, 2, 171, 222
See application file for complete search history.

(56) References Cited

U.S. PATENT DOCUMENTS

| 4,351,403 | A | * | 9/1982 | Ferguson | 177/2 |
| 2004/0007373 | A1 | | 1/2004 | Higuchi et al. | |
| 2008/0266765 | A1 | | 10/2008 | Liang et al. | |
| 2009/0032637 | A1 | * | 2/2009 | Yoshioka | 242/562 |

FOREIGN PATENT DOCUMENTS

JP    2010010541 A    1/2010

* cited by examiner

*Primary Examiner* — Huan Tran
(74) *Attorney, Agent, or Firm* — Leydig, Voit & Mayer, Ltd.

(57) ABSTRACT

A printing unit for a weighing device, which has a housing and a load plate, includes an interior configured to hold a print medium. A front panel has a printer opening communicating with the interior for passage of the print medium therethrough. A top cover is disposed above the front panel and extends in an opening direction from the housing of the weighing device, past an edge of the load plate of the weighing device and to the front panel. A side edge cover is disposed at each side of the top cover. The top cover, front panel and side edge covers are shaped so as to direct a liquid from the load plate toward at least one of a bottom region and a drain of the printing unit without entering into the interior.

18 Claims, 6 Drawing Sheets

PRINTING UNIT FOR A WEIGHING DEVICE

FIELD

The present invention relates to a printing unit, in particular, for use with a weighing device, that protects against water damage.

BACKGROUND

Weighing devices, such as retail scales, are used, for example, in supermarkets, delicatessens, etc., for weighing quantities of edible consumer products. These weighing devices typically include a printing unit for printing out paper receipts or labels having the weight, price, product type and the like. These receipts or labels exit through an opening of the printing unit for removal, for example, using a tearing blade. In order to maintain the hygienic standards necessary for such weighing devices, the weighing devices must be cleaned regularly. However, this regular cleaning, especially when done with less care and larger amounts of water or cleaning fluid, presents the risk that the water or cleaning fluid will infiltrate into the opening of the printing unit of the weighing device and thereby damage the printing unit and cause the printing unit or the entire weighing device to have to be replaced.

One method of making a housing waterproof is to have the housing fully enclose internal components to seal the internal components in the housing. However, printing units should advantageously include at least one opening, in contrast to an enclosed compartment, in order to deliver and provide easy and immediate access to printed substrates. For example, a retail scale will ordinarily print and deliver labels including a price, weight, product type, etc. For this purpose, therefore, the printing unit of a retail scale has at least one opening through which water can infiltrate. In addition to this at least one opening, further challenges to making a housing of a printer unit waterproof are presented by the fact that the interiors of printing units should be easily accessible for changing label rolls, service, maintenance, etc.

SUMMARY

In an embodiment, the present invention provides a printing unit for a weighing device which has a housing and a load plate. The printing unit includes an interior configured to hold a print medium. A front panel has a printer opening communicating with the interior for passage of the print medium therethrough. A top cover is disposed above the front panel and extends in an opening direction from the housing of the weighing device, past an edge of the load plate of the weighing device and to the front panel. A side edge cover is disposed at each side of the top cover. The top cover, front panel and side edge covers are shaped so as to direct a liquid from the load plate toward at least one of a bottom region and a drain of the printing unit without entering into the interior.

BRIEF DESCRIPTION OF THE DRAWING

The present invention will be described in even greater detail below based on the exemplary figures. The invention is not limited to the exemplary embodiments. Features described and/or represented in the various figures can be used alone or combined in embodiments of the present invention. Other features and advantages of various embodiments of the present invention will become apparent by reading the following detailed description with reference to the attached drawings which illustrate the following.

Arrows shown in the figures which do not include a reference letter indicate a direction of flow of water or cleaning fluid. Unlabeled components in various figures can be determined by reference to the other figures.

DETAILED DESCRIPTION

Figure 1:
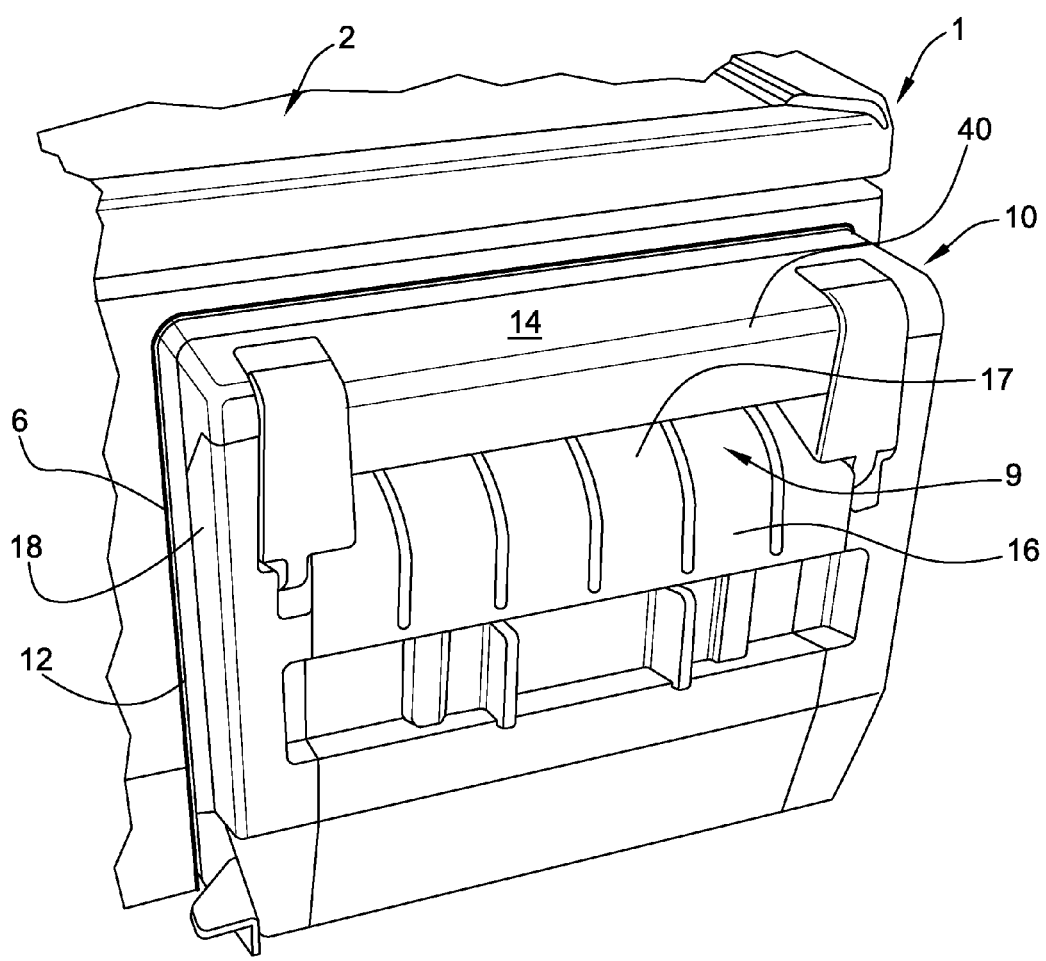
FIG. 1 is a perspective sectional view of a scale equipped with a printing unit according to an exemplary embodiment of the present invention.

Referring to FIG. 1, a weighing device, which in the embodiment shown in FIG. 1 is a scale 1 which, for example, is for use in retail settings for weighing foods, includes a load plate 2 and a printing unit 10. The printing unit 10 is used to print receipts or labels containing prices, weights, type of product and the like. The printing unit 10 can be integral to the scale 1 or can be assembled to the scale 1, for example, by inserting the printing unit 10 in an insertion direction I (see FIG. 2) into a recess 6 of a side or front 7 of the housing 4 of the scale 1. Advantageously, the printing unit 10 can also be easily retracted from the recess 6, for example, by a spring-actuated release mechanism, in the opening direction O in order to change spools, ink, service the printer, etc.

Figure 2:
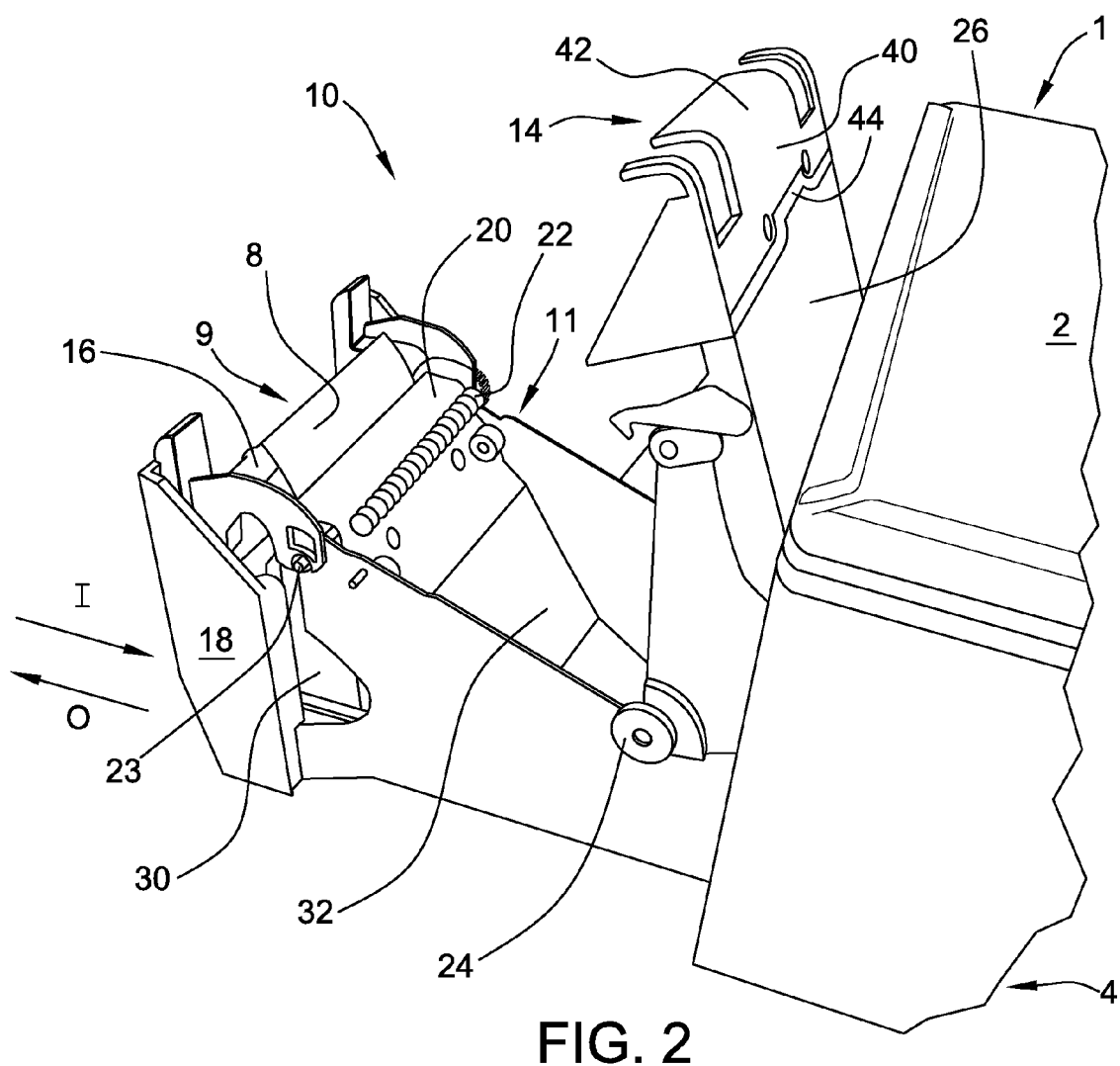
FIG. 2 is a perspective sectional view of the scale of FIG. 1 with the printing unit in a retracted and open position.

FIG. 2 shows the printing unit 10 in a retracted and open position. The printing unit 10 can be, for example, a thermal direct printer for labels with or without a liner. In the embodiment shown, the printing unit 10 is of the so-called clamshell printer type. General clamshell printers can be purchased commercially, for example, in models produced by Paxar Corp. or Intermec Inc. Therefore, the internal circuitry and components for printing the printed substrate using such printers is generally known to an ordinarily skilled artisan and is not explained in detail herein except as needed to provide a better understanding of the present invention.

The printing unit 10 preferably internally includes a printer head cover 20 which is waterproof to provide additional protection to the printer head and/or other components of the printing unit in the case that any water or cleaning fluid is able to enter the interior 11 of the printing enters from above. The printer head cover 20 or a separate cover can also protect a front section 30 having a first spool 23. A rear section 32 which, for example, can house a second spool 24 can be accessed by the clamshell-type opening of a spool cover 26 which can extend to the front panel 14 and which is also waterproof to protect the rear section 32 in the case that any water or cleaning fluid is able to infiltrate into the interior 11. Additional covers 29 (see FIG. 4) can also be provided to protect other components in the interior 11 of the printing unit 10, such as, for example a motor cover 28 at least partially covering mechanisms 27 of the printing unit 10. However, as discussed herein, embodiments of the present invention advantageously prevent any water or cleaning fluid from entering the interior 11 and therefore the covers, 20, 26, 28, 29 are provided in some embodiments as additional protection.

In an exemplary operation of the printing unit 10, an ordinary roll of paper can be provided as the print medium 8 in the front section 30 from the first spool 23, printed and then conveyed to the printer opening 9. For other types of labels or receipts, such as self-adhesive ones, an adhesive print medium 8 can be provided in the rear section 32 on a second spool 24, with or without a liner on the adhesive side. In this case, the print medium 8 is guided with its adhesive side over guide ribs 22, which are preferably made of a material which prevents the adhesive side from sticking to it, to the printer opening 9. Where a liner is provided, the liner can be wound on the first spool 24. A blade 21 for tearing the print medium 8 can be disposed at the printer opening 9, for example, below the top cover 14, or elsewhere in an interior 11 of the printing unit 10. In this way, the top cover 14 not only prevents damage to the printing unit 10 by directing water or cleaning fluid away from the interior 11, but also advantageously prevents injury by users by concealing the tearing blade 21 and protecting the blade 21 from water damage.

Figure 3:
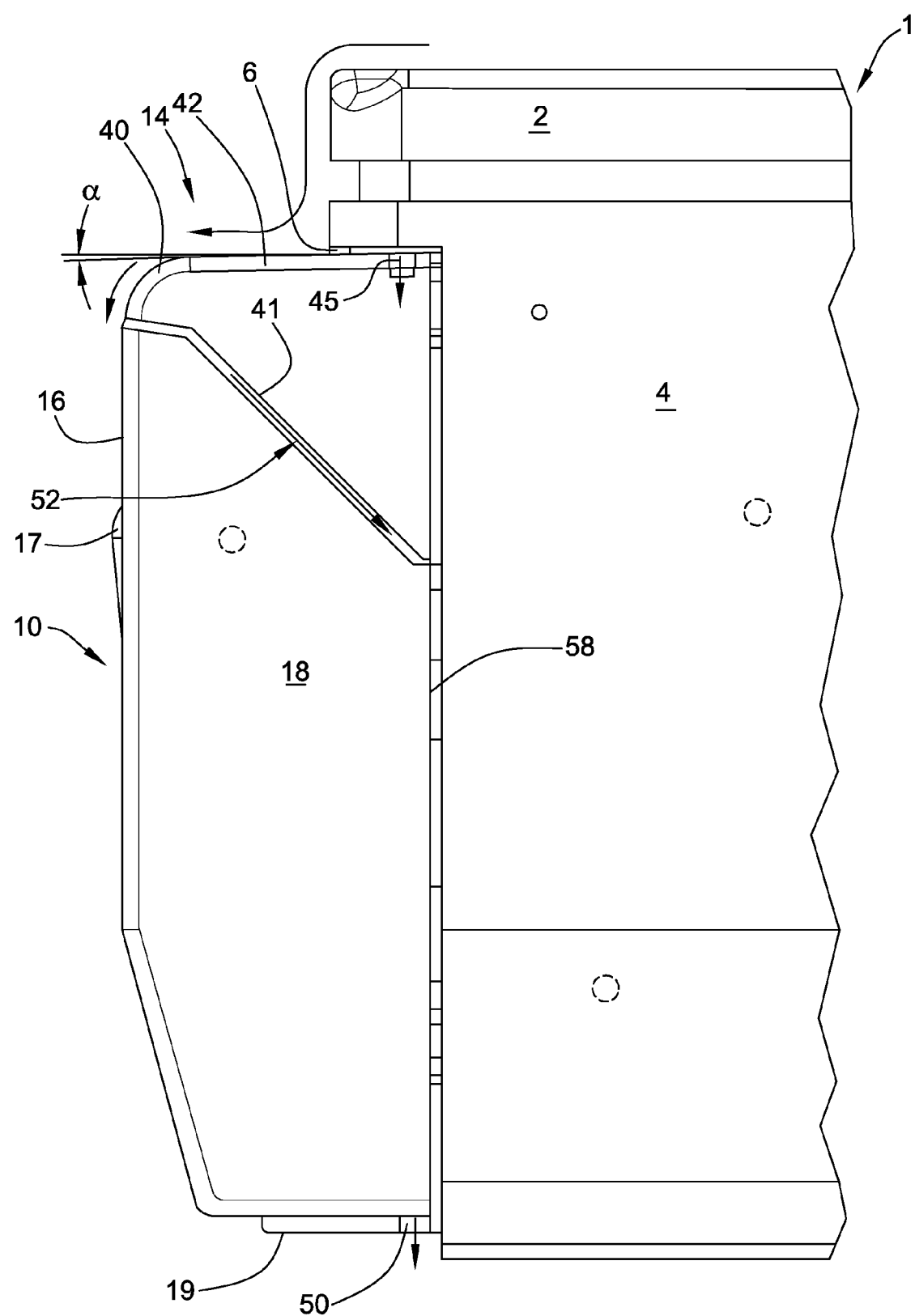
FIG. 3 is a side view of a printing unit according to an exemplary embodiment of the present invention.

Referring to FIGS. 1-3, the printing unit 10 includes, at a front panel 16, a printer opening 9, through which a print medium 8, which is for example the receipt or label, is provided. Preferably, the printer opening 9 is disposed in a convenient location with respect to the scale 1 so that, for example, in a retail setting, users are able to easily and quickly access the receipts or labels. In an embodiment, the printing unit 10 advantageously protrudes from the side or front 7 of the housing 4 of the scale 1 past the load plate 2, as best illustrated in FIG. 3, in order to make the receipt or label more accessible and prevent a user from having to reach below the load plate 2.

When the load plate 2 is cleaned, water or cleaning fluid will often overflow or be pushed off the edges of the load plate 2. Thus, as shown in FIG. 3, the water or cleaning fluid will flow or drip over the side of the load plate 2 and along the housing 4 of the scale 1 where the printing unit 10 is located. In the embodiment shown, because the printing unit 10 protrudes past an edge of the load plate 2, the water or cleaning fluid flows onto a top cover 14 of the printing unit 10 and at least partially continues to flow toward and along the front panel 16 where the printer opening 9 is located. Preferably, the front panel 16 includes a lower lip 17 that is slanted or curved so as to direct any water that flows or drips along the front panel 16 away from the printer opening 9. The lower lip 17 can also extend past the face of the front panel 16, as shown in FIG. 3, to further facilitate the deflection of water or cleaning fluid away from the printer opening 9.

In an embodiment, the top cover 14 is sloped or slanted toward the upper lip 40 so as to gravitationally facilitate the flow of water or cleaning fluid away from recess 6 of the scale 1. For example, the drainage plate 42 can extend at an angle $\alpha$ downward from its rear edge 49 to its front edge 46 (see FIG. 4) where the top cover 14 transitions to the upper lip 40 to encourage the water to flow away from the scale 1 and down the front panel 16 or down the edge cover 18. This angle $\alpha$ can be, for example, 1 degree.

Figure 4:
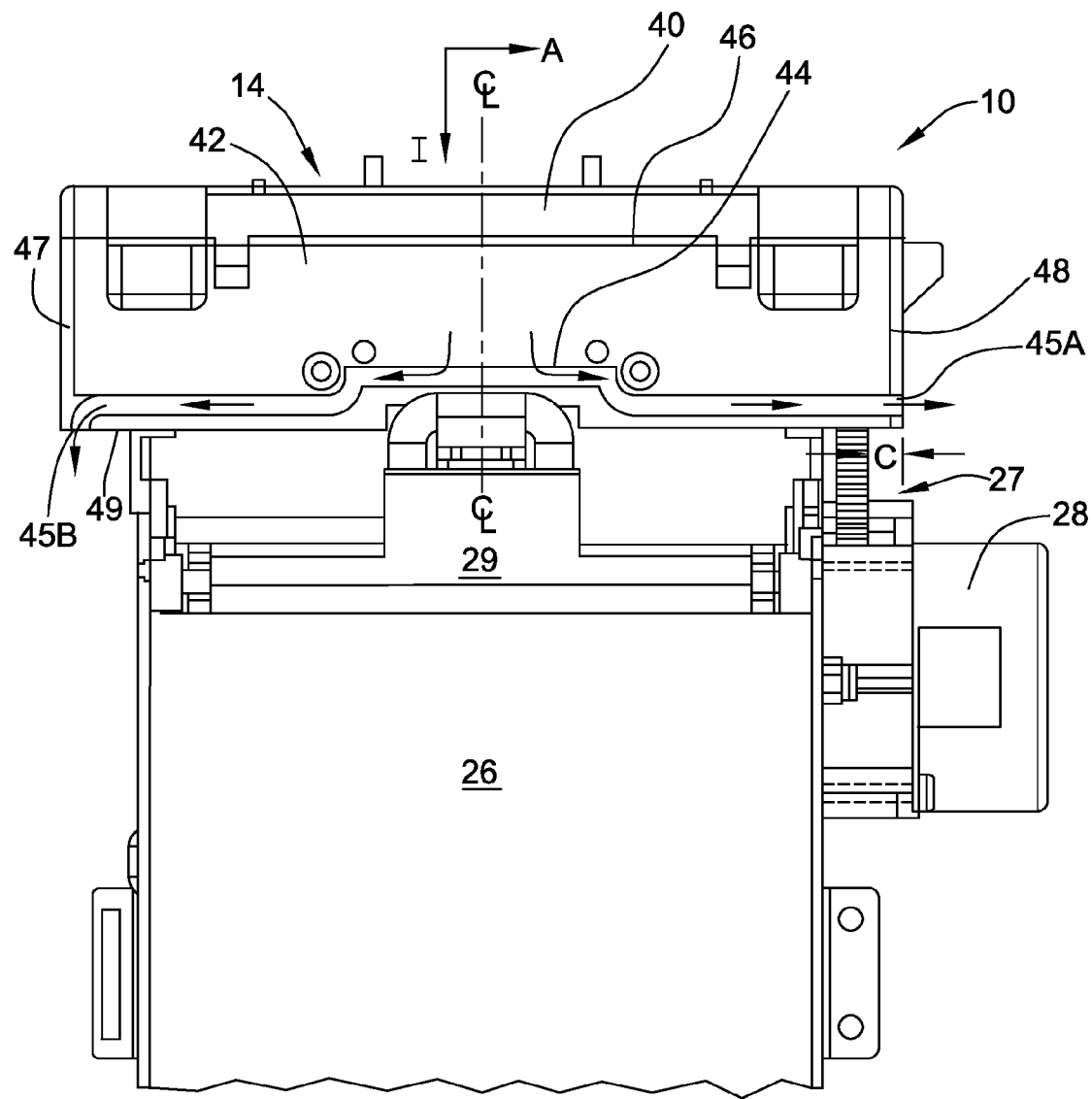
FIG. 4 is a top view of the printing unit of FIG. 3 in a retracted position.

However, especially in cases where too much water or cleaning fluid spills or overflows onto the top cover 14, the top panel can include drainage channels 44 to direct the water away and prevent it from entering into or further into the recess 6, or the interior 11 of the printing unit 10. The bottom of the drainage channel 44 can be level, or could be sloped or slanted downward, for example, by 1 degree, on each side from a center line CL in direction A to encourage the flow of water or cleaning fluid toward a first or second side 47, 48 of the drainage plate 42, or toward the rear side 49 of the drainage plate 42. For example, as shown in FIG. 4, the drainage plate 42 includes a continuous drainage channel 44 having a first outlet 45A at the second side 48 and a second outlet 45B at the rear side 49. However it is noted that the outlets 45A, 45B can be provided at other appropriate drainage locations and, in the embodiment of FIG. 4, the first outlet is at the second side 48, rather than the rear side 49 in order to advantageously direct the water or cleaning fluid further away from mechanisms 27 of the printing unit 10. Nevertheless, in an embodiment, it is preferable that any exposed mechanisms 27 be formed of a material that is resistant to water damage, such as plastic.

Referring to FIGS. 3 and 4, the top cover 14, in the embodiment shown, connects, when the printing unit 10 is closed, at first and second sides 47, 48 to side edge covers 18. The edge cover 18 includes a canted surface 52 and the top cover 14 includes a corresponding canted surface 41 such that water or cleaning fluid flowing over the sides of the printing unit 10 is deflected along the canted surface 52. In the embodiment shown, the canted surface 52 is slanted downward toward a rear edge 58 of the edge cover 18 and is directed to a drain 50 at a bottom panel 19 of the printing unit 10. However, canted surface 52 can also be sloped or curved so as to deflect the water toward the front panel 16 or to another drainage area. The drain 50 can be disposed in an open area in the bottom panel 19 and/or at a bottom region of one or both edge covers 18 (see FIG. 5).

Figure 5:
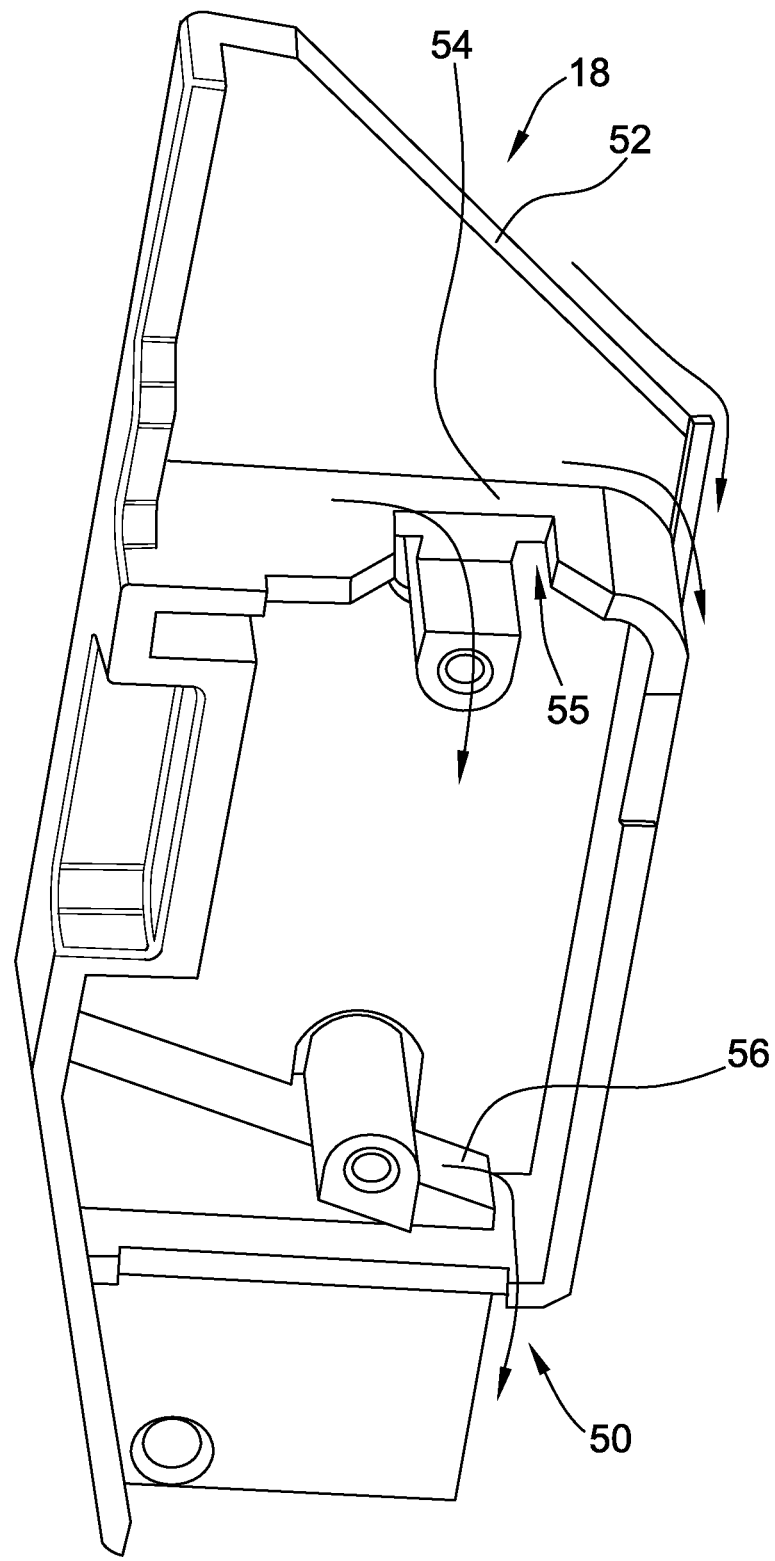
FIG. 5 is a perspective view of an edge cover of a printing unit according to an exemplary embodiment of the present invention.
Figure 6:
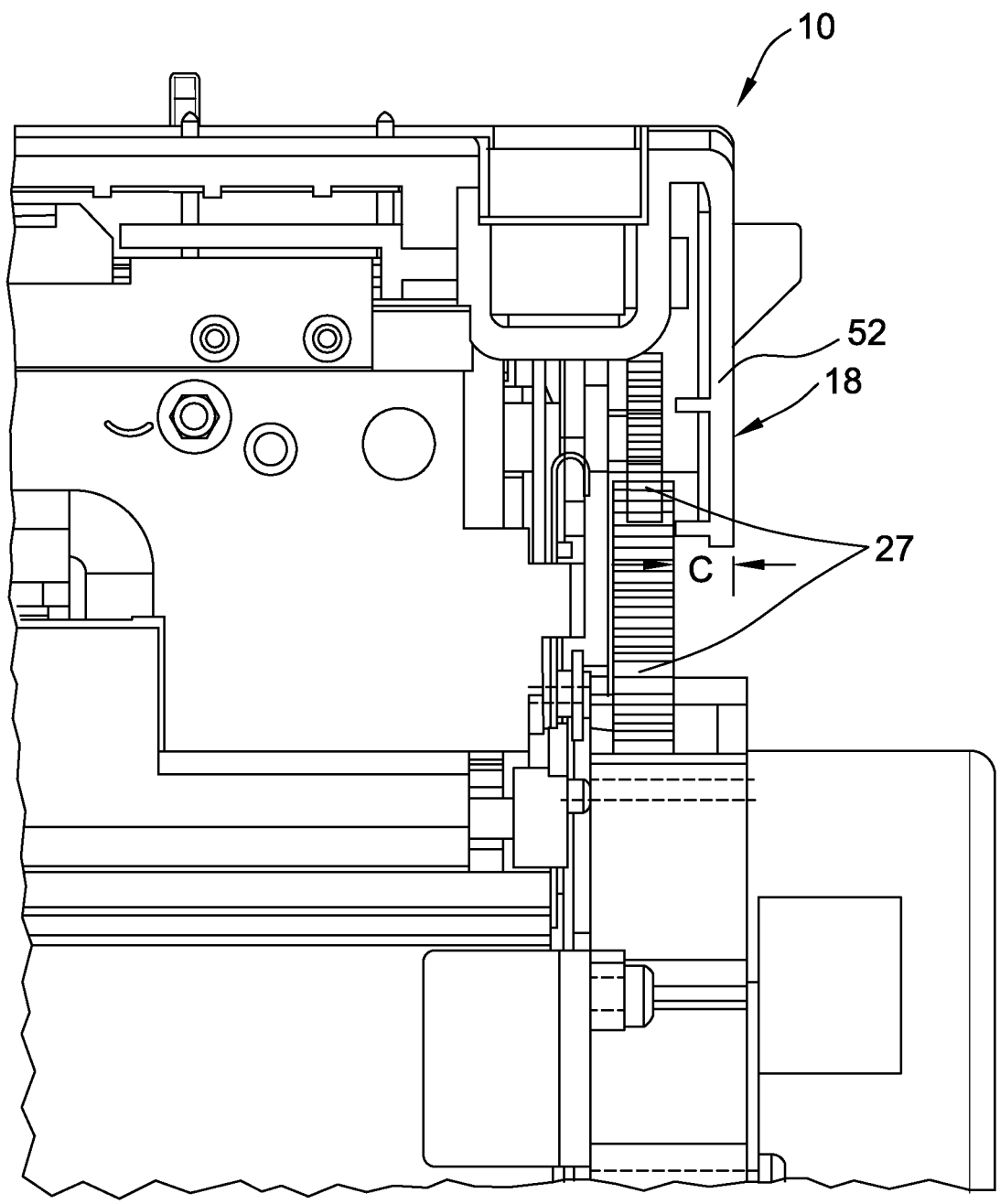
FIG. 6 is a sectional top view of the printing unit of FIG. 4.

Referring to FIG. 5 showing an interior side of one of the edge covers 18, water or cleaning fluid which enters, for example, by capillary action, between canted surface 52 and corresponding canted surface 41, can be directed toward the drain 50 in a number of ways. For example, as shown in FIG. 5, the water or cleaning fluid can partially flow along the canted surface 52 and or downward toward the drain 50 along slanted or sloped noses 54, 56. A first, upper nose 54 can also include a recess 55 to allow the water or cleaning fluid to flow down to the drain 50 or to a second, lower nose 56. As shown in FIG. 6, a clearance C is advantageously provided between the canted surface 52 and any mechanisms 27 of the printing unit 10. In an embodiment, edge covers 18 are separate components from the front panel 16 and the top cover 14 and the interiors of which serve as a drainage area that is separate from all other components of the printing unit 10. For example, the front panel 16 can have a solid wall between itself and the interior side of the edge covers 18 shown in FIG. 5.

Preferably, the top cover 14, front panel 16 and edge covers 18 are formed from plastic, for example, polycarbonate.

The use of terms "panels," "covers," "plates" and the like should not be interpreted as requiring separate and/or one-piece components; rather, such components can also be formed of multiple parts and/or integrally formed with one another or other components except as set forth herein.

While the invention has been particularly shown and described with reference to preferred embodiments thereof, it will be understood by those skilled in the art that various changes in form and details may be made therein without departing from the spirit and scope of the invention. Further, the present invention is not limited to the embodiments described herein; reference should be had to the appended claims.

What is claimed is:

1. A printing unit for a weighing device having a housing and a load plate, the printing unit comprising:
   an interior configured to hold a print medium;
   a front panel having a printer opening communicating with the interior for passage of the print medium therethrough;

a top cover disposed above the front panel and extending in an opening direction from the housing of the weighing device, past an edge of the load plate of the weighing device and to the front panel; and a side edge cover disposed at each side of the top cover, wherein the top cover, front panel and side edge covers are shaped so as to direct a liquid from the load plate toward at least one of a bottom region and a drain of the printing unit without entering into the interior.

2. The printing unit according to claim 1, wherein the printer opening is disposed between an upper lip formed by the top cover and a lower lip formed by the front panel.

3. The printing unit according to claim 2, further comprising a tearing blade disposed at the printer opening for tearing the print medium, the upper lip covering the tearing blade.

4. The printing unit according to claim 2, wherein the lower lip has a downward slope such that liquid dripping from the upper lip will be directed downward away from the printer opening.

5. The printing unit according to claim 1, wherein each of the side edge covers includes a canted surface extending toward the at least one of a bottom region and a drain of the printing unit.

6. The printing unit, according to claim 1, wherein the top cover extends at an angle downwards in the opening direction.

7. The printing unit according to claim 1, wherein the top cover includes a drainage channel having at least one outlet.

8. The printing unit according to claim 7, where the at least one drainage channel is disposed at an angle downwards toward the at least one outlet.

9. The printing unit according to claim 1, wherein the top cover includes a drainage plate and an upper lip, the drainage plate extending from below the edge of the load plate to the upper lip and the upper lip extending to the front panel.

10. The printing unit according to claim 1, further comprising spool cover formed from plastic and disposed above at least one section of the interior.

11. The printing unit according to claim 1, wherein each of the edge covers includes at least one nose that is at least one of slanted and sloped so as to direct liquid toward the at least one of a bottom region and a drain of the printing unit.

12. A retail scale comprising:

a load plate; and a printing unit disposed below the load plate and including a front panel having a printer opening communicating with an interior of the printing unit for delivery of a print medium therethrough, the printing unit including a top cover disposed above the front panel and extending from a housing of the retail scale and past an edge of the load plate.

13. The retail scale according to claim 12, wherein the top cover includes an upper lip disposed above the printer opening and the front panel includes a lower lip disposed below the printer opening.

14. The retail scale according to claim 13, further comprising a tearing blade disposed at the printer opening for tearing the print medium, the upper lip covering the tearing blade.

15. The printing unit according to claim 13, wherein the lower lip has a downward slope such that liquid dripping from the upper lip will be directed downward away from the printer opening.

16. The priming unit according to claim 12, wherein the top cover extends at an angle downwards towards the front panel.

17. The retail scale according to claim 16, wherein the top cover includes a drainage channel including at least one outlet.

18. The retail scale according to claim 12, further comprising a side edge cover disposed at each side of the top cover and including at least one of a canted surface and a nose configured to direct liquid toward at least one of a bottom region and a drain of the printing unit.

* * * * *